US009013539B1

(12) United States Patent
Fulay et al.

(10) Patent No.: US 9,013,539 B1
(45) Date of Patent: Apr. 21, 2015

(54) VIDEO CONFERENCING SYSTEM AND METHOD

(71) Applicant: Google Inc., Mountain View, CA (US)

(72) Inventors: Amit Fulay, Seattle, WA (US); Chee H. Chew, Redmond, WA (US)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 14/014,519

(22) Filed: Aug. 30, 2013

(51) Int. Cl.
*H04N 7/14* (2006.01)
*H04N 7/15* (2006.01)

(52) U.S. Cl.
CPC ...................................... *H04N 7/15* (2013.01)

(58) Field of Classification Search
USPC .......................... 348/14.08; 709/204; 370/260
See application file for complete search history.

(56) References Cited

U.S. PATENT DOCUMENTS

| | | | | |
|---|---|---|---|---|
| 5,438,588 | A * | 8/1995 | Wanner .......................... | 373/108 |
| 6,288,739 | B1 * | 9/2001 | Hales et al. ................. | 348/14.07 |
| 8,249,571 | B2 * | 8/2012 | Jacobstein et al. ............ | 455/416 |
| 8,903,916 | B2 * | 12/2014 | Ratakonda et al. ........... | 709/205 |
| 2007/0094661 | A1 * | 4/2007 | Baird et al. ................... | 718/102 |
| 2009/0296608 | A1 * | 12/2009 | Khan et al. .................... | 370/260 |

* cited by examiner

*Primary Examiner* — Creighton Smith (57) ABSTRACT

A method and computing system for scheduling a multi-session video conference for a host. A plurality of discrete video conference sessions are linked to the multi-session video conference. The multi-session video conference is executed. The host is transferred between two or more of the discrete video conference sessions during the multi-session video conference.

21 Claims, 4 Drawing Sheets

VIDEO CONFERENCING SYSTEM AND METHOD

TECHNICAL FIELD

This disclosure relates to video conferencing and, more particularly, to allowing a participant to move between separate video conferencing sessions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

One such use of the Internet is to allow people to video conference with each other. As video conferencing adds a video component to a communication session, such communication sessions tend to be more enjoyable for the participants. Unfortunately, video conferences do not allow participants to move between distinct video conference sessions.

SUMMARY OF DISCLOSURE

In one implementation, a computer-implemented method includes scheduling a multi-session video conference for a host, wherein the host is a celebrity. A plurality of discrete video conference sessions are defined. The plurality of discrete video conference sessions are linked to the multi-session video conference. One or more participants are registered for participation in one or more of the discrete video conference sessions. The multi-session video conference is executed. The host is transferred between two or more of the discrete video conference sessions during the multi-session video conference.

In another implementation, a computer-implemented method includes scheduling a multi-session video conference for a host. A plurality of discrete video conference sessions are linked to the multi-session video conference. The multi-session video conference is executed. The host is transferred between two or more of the discrete video conference sessions during the multi-session video conference.

One or more of the following features may be included. The host may be a celebrity. One or more participants may be registered for participation in one or more of the discrete video conference sessions. The one or more discrete video conference sessions may have a defined maximum number of participants. The plurality of discrete video conference sessions may be defined. Transferring the host between two or more of the plurality of discrete video conference sessions may include receiving a request from the host to move from a first discrete video conference session to a second discrete video conference session. Transferring the host between two or more of the plurality of discrete video conference sessions may include removing the host from the first discrete video conference session. Transferring the host between two or more of the plurality of discrete video conference sessions may include adding the host to the second discrete video conference session. The multi-session video conference may be announced via a social network. Executing the multi-session video conference may include executing the multi-session video conference and the plurality of discrete video conference sessions within a social network.

In another implementation, a computing system includes a processor and memory configured to perform operations including scheduling a multi-session video conference for a host. A plurality of discrete video conference sessions are linked to the multi-session video conference. The multi-session video conference is executed. The host is transferred between two or more of the discrete video conference sessions during the multi-session video conference.

One or more of the following features may be included. The host may be a celebrity. One or more participants may be registered for participation in one or more of the discrete video conference sessions. The one or more discrete video conference sessions may have a defined maximum number of participants. The plurality of discrete video conference sessions may be defined. Transferring the host between two or more of the plurality of discrete video conference sessions may include receiving a request from the host to move from a first discrete video conference session to a second discrete video conference session. Transferring the host between two or more of the plurality of discrete video conference sessions may include removing the host from the first discrete video conference session. Transferring the host between two or more of the plurality of discrete video conference sessions may include adding the host to the second discrete video conference session. The multi-session video conference may be announced via a social network. Executing the multi-session video conference may include executing the multi-session video conference and the plurality of discrete video conference sessions within a social network.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Introduction

Figure 1:
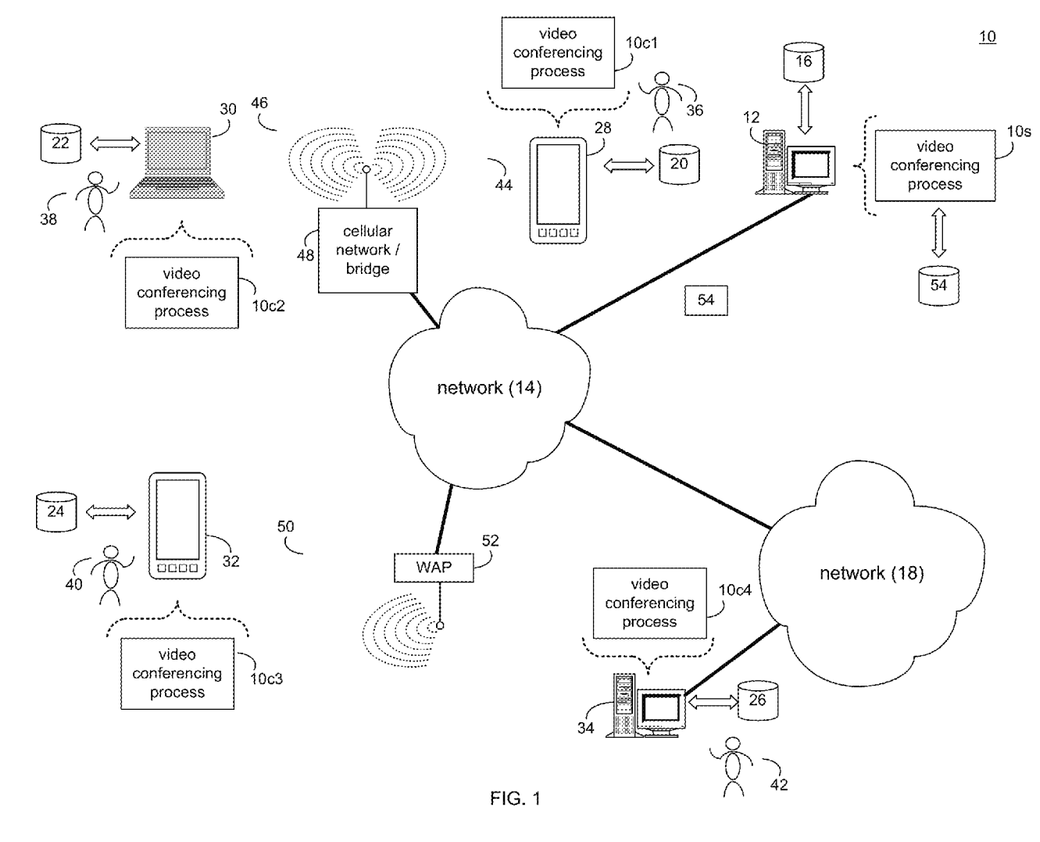
FIG. 1 is a diagrammatic view of a distributed computing network including a computing device that executes a video conferencing process according to an implementation of the present disclosure.
Figure 2:
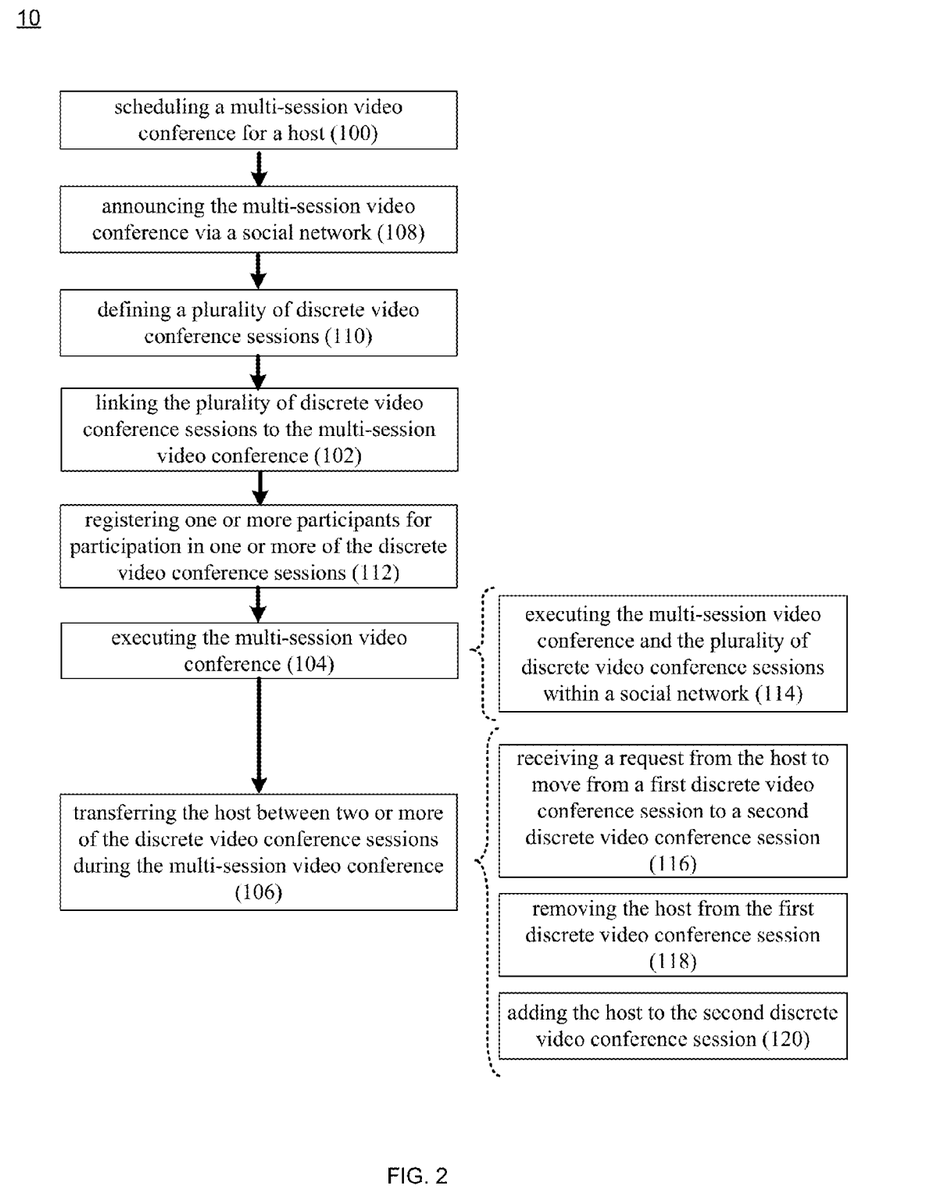
FIG. 2 is a flowchart of the video conferencing process of FIG. 1 according to an implementation of the present disclosure.

In FIGS. 1 & 2, there is shown video conferencing process 10. Video conferencing process 10 may be implemented as a server-side process, a client-side process, or a hybrid server-side/client-side process. For example, video conferencing process 10 may be implemented as a purely server-side process via video conferencing process 10s. Alternatively, video conferencing process 10 may be implemented as a purely client-side process via one or more of video conferencing process 10c1, video conferencing process 10c2, video conferencing process 10c3, and video conferencing process 10c4. Alternatively still, video conferencing process 10 may be implemented as a hybrid server-side/client-side process via video conferencing process 10s in combination with one or more of video conferencing process 10c1, video conferencing process 10c2, video conferencing process 10c3, and video conferencing process 10c4. Accordingly, video conferencing process 10 as used in this disclosure may include any combination of video conferencing process 10s, video conferencing process 10c1, video conferencing process 10c2, video conferencing process 10c3, and video conferencing process 10c4.

As will be discussed below in greater detail, video conferencing process 10 may schedule 100 a multi-session video conference for a host. Video conferencing process 10 may link 102 a plurality of discrete video conference sessions to the multi-session video conference. Video conferencing process 10 may execute 104 the multi-session video conference and may transfer 106 the host between two or more of the discrete video conference sessions during the multi-session video conference.

Video conferencing process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of video conferencing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of video conferencing processes 10c1, 10c2, 10c3, 10c4 may include but are not limited to a web browser, a web browser plug-in or applet, a game console user interface, a video conference user interface, or a specialized application (e.g., an application running on e.g., the Android™ platform, the iOS™ platform, the Blackberry™ platform). The instruction sets and subroutines of video conferencing processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions, such as multiuser video conferences that may allow for virtual gatherings of people so that they may chat about specific topics.

Video Conferencing Process

Figure 3:
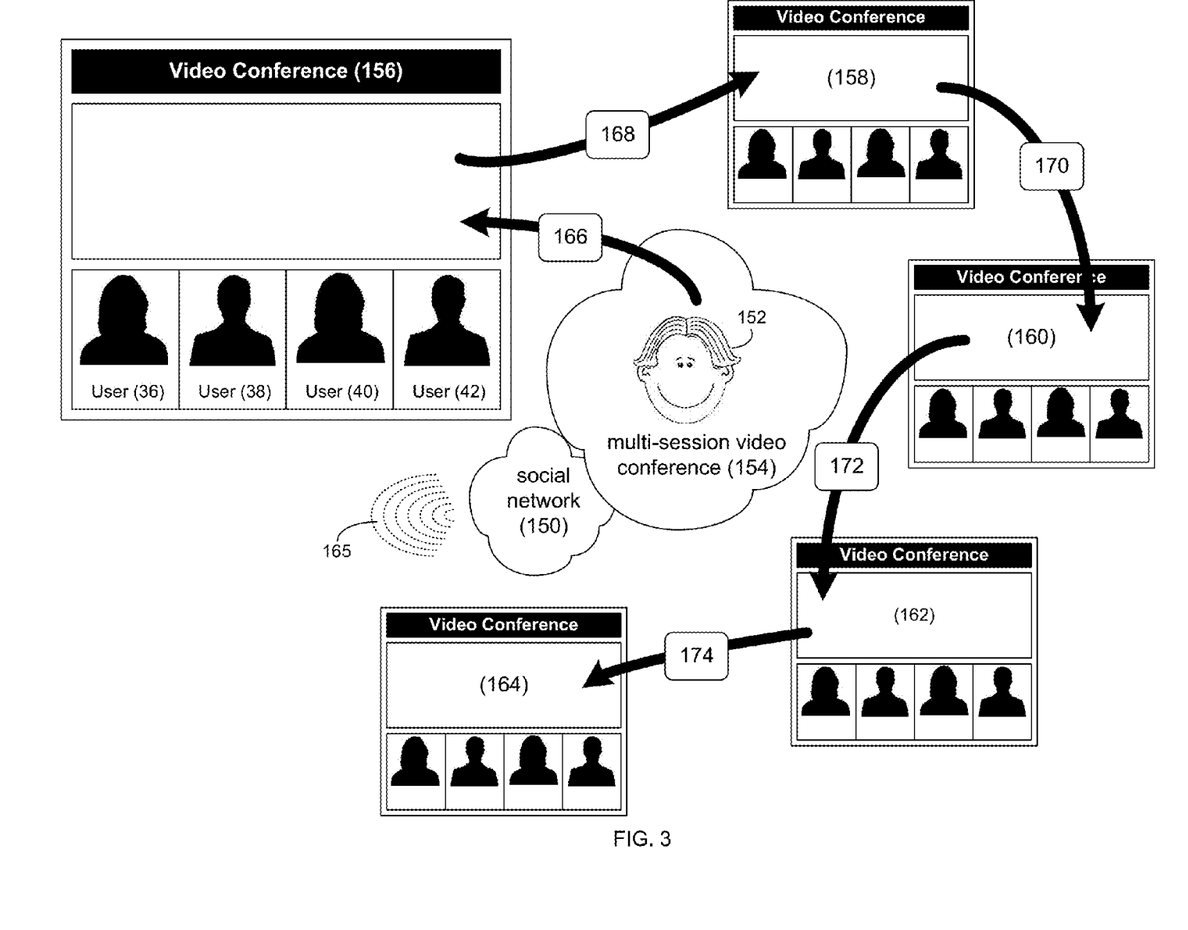
FIG. 3 is a diagrammatic view of a video conference managed by the video conferencing process of FIG. 1 according to an implementation of the present disclosure.

Referring also to FIG. 3, assume for illustrative purposes that users 36, 38, 40, 42 are all members of social network 150. Further, assume for this example that a host (e.g., celebrity 152) wants to organize a multi-session video conference (e.g. multi-session video conference 154) for the purpose of promoting their newly-released album.

While, in the following example, the host is described as being celebrity 152, this is for illustrative purposes only and is not intended to be a limitation of this disclosure, as other configurations/situations are possible and are considered to be within the scope of this disclosure. For example, the host should be broadly construed to include individuals, agents of those individuals, companies, agents of those companies, a personal account within social network 150 (which may be managed by the individual), a professional account within social network 150 (which may be managed by the professional or an agent of the professional), or a commercial page within social network 150 for e.g., a company, a product, a service, or an event.

During multi-session video conference 154, celebrity 152 may interact with various participants of multi-session video conference 154. Multi-session video conference 154 may be configured to allow a plurality of discrete video conference sessions (e.g., discrete video conference sessions 156, 158, 160, 162, 164) to interface with and be coupled to multi-session video conference 154 so that e.g., celebrity 152 may visit one or more of e.g., discrete video conference sessions 156, 158, 160, 162, 164 during multi-session video conference 154.

Assume for illustrative purposes that celebrity 152 is a popular celebrity and a large number of people that would like to participate in a video conference hosted by celebrity 152. Unfortunately, traditional video conference systems may only be able to accommodate a defined number of participants (e.g. a maximum of ten participants). However, since multi-session video conference 154 may interface with and be coupled to a plurality of discrete video conference sessions (e.g., discrete video conference sessions 156, 158, 160, 162, 164), a large quantity of people may participate in the video conference hosted by celebrity 152 through the use of a large quantity of discrete video conference sessions.

While the following discussion concerns multi-session video conference 154 and the plurality of discrete video conference sessions (e.g., discrete video conference sessions 156, 158, 160, 162, 164) being executed within social network 150, this is for illustrative purposes only and is not intended to be a limitation of this disclosure, as other configurations are possible. For example, multi-session video conference 154 and the plurality of discrete video conference sessions may be executed outside of social network 150 by way of e.g. a stand-alone communications application/product (not shown). For illustrative purposes, further assume that multi-session video conference 154 and the plurality of discrete video conference sessions (e.g., discrete video conference sessions 158, 160, 162, 164) may be executed through computing device 12, wherein (in this example) users 36, 38, 40, 42 may access multi-session video conference 154 and the plurality of discrete video conference sessions via client electronic devices 28, 30, 32, 34 (respectively).

Continuing with the above-stated example, assume that celebrity 152 would like to host a multi-session video conference (e.g., multi-session video conference 154). Video conferencing process 10 may be configured to allow a multi-session video conference (e.g., multi-session video conference 154) to be scheduled 100 for a host (e.g., celebrity 152). For example and referring also to FIG. 4, video conferencing process 10 may render scheduling window 200 that may allow celebrity 152 (or an agent of celebrity 152) to schedule multi-session video conference 154. Scheduling window 200 may allow celebrity 152 (or an agent of celebrity 152) to define a time (within time field 202); a date (within date field 204); a duration (within duration field 206); and a topic (within topic field 208) for multi-session video conference 154.

Figure 4:
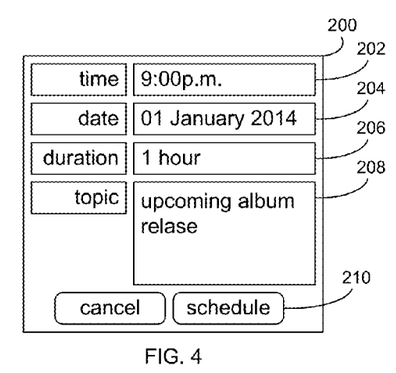
FIGS. 4-6 are diagrammatic views of user interfaces rendered by the video conferencing process of FIG. 1 according to an implementation of the present disclosure.
Figure 5:
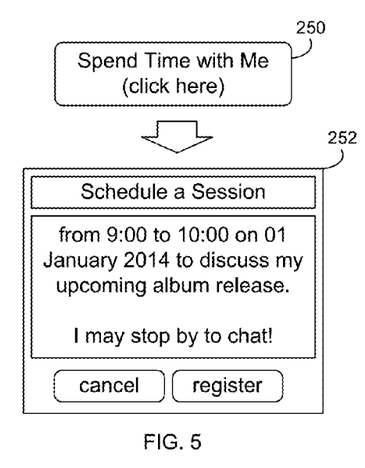

Once defined, schedule button 210 may be selected, resulting in video conferencing process 10 scheduling 100 multi-session video conference 154. Once scheduled 100, video conferencing process 10 may be configured to announce 108 multi-session video conference 154 via social network 150 (e.g., on a social network homepage of celebrity 152). As discussed above, while multi-session video conference 154 and the plurality of discrete video conference sessions are described as being executed within social network 150, this is for illustrative purposes only and is not intended to be a limitation of this disclosure. Accordingly, video conferencing process 10 may be configured to announce multi-session video conference 154 via e.g., an official website of celebrity 152.

Upon seeing the above-described announcement, fans of celebrity 152 may wish to participant in multi-session video conference 154. Accordingly, video conferencing process 10 may be configured to define 110 a plurality of discrete video conference sessions (e.g., discrete video conference sessions 156, 158, 160, 162, 164).

Video conferencing process 10 may link 102 the plurality of discrete video conference sessions (e.g., discrete video conference sessions 156, 158, 160, 162, 164) to multi-session video conference 154 so that each of the plurality of discrete video conference sessions (e.g., discrete video conference sessions 156, 158, 160, 162, 164) is configured to interface with and be coupled to multi-session video conference 154, thus allowing e.g., celebrity 152 to visit one or more of e.g., discrete video conference sessions 156, 158, 160, 162, 164 during multi-session video conference 154.

Figure 6:
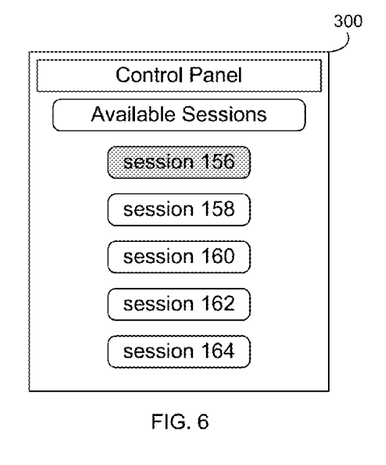

For example and referring also to FIG. 6, video conferencing process 10 may render announcement button 250 that, when selected, may render scheduling window 252 that may allow a user (e.g., user 36) to define 110 and link 102 a discrete video conference session (e.g., discrete video conference sessions 158) to multi-session video conference 154.

Once the discrete video conference sessions (e.g., discrete video conference sessions 156, 158, 160, 162, 164) are defined 110 and linked 102 with multi-session video conference 154, video conferencing process 10 may be configured to register 112 one or more participants for participation in these discrete video conference sessions. For example, assume that users 36, 38, 40, 42 are all fans of celebrity 152, and that discrete video conference session 156 was defined 110 for and linked 102 to multi-session video conference 154. Accordingly, each of users 36, 38, 40, 42 may register 112 for participation in discrete video conference sessions 156.

As discussed above, one or more of e.g., discrete video conference sessions 156, 158, 160, 162, 164 may have a defined maximum number of participants (e.g., 10 people). Accordingly, if a user wishes to participate in a discrete video conference session (e.g., discrete video conference session 158) . . . but the session is full, the user may define 110 and link 102 a new discrete video conference session with multi-session video conference 154.

At the appropriate time (in this example, 9:00 p.m. on 1 Jan. 2014), video conferencing process 10 may execute 104 multi-session video conference 154. When executing multi-session video conference 154, video conferencing process 10 may be configured to broadcast a video feed (e.g., video feed 165) of celebrity 152 to each of the discrete video conference sessions (e.g., discrete video conference sessions 156, 158, 160, 162, 164), wherein each of the discrete video conference sessions (e.g., discrete video conference sessions 156, 158, 160, 162, 164) may receive video feed 165 of celebrity 152, which may be shown to the participants (e.g., users 36, 38, 40, 42) of the discrete video conference sessions (e.g., discrete video conference session 156).

When executing 104 multi-session video conference 154, video conferencing process 10 may execute 114 multi-session video conference 154 and the plurality of discrete video conference sessions (e.g., discrete video conference sessions 156, 158, 160, 162, 164) within (e.g., as a portion of) social network 150. However and as discussed above, multi-session video conference 154 and the plurality of discrete video conference sessions need not be executed within social network 150. Accordingly, video conferencing process 10 may be configured to execute multi-session video conference 154 and the plurality of discrete video conference sessions outside of social network 150 via e.g., a stand-alone video conferencing platform/application.

During the execution 104 of multi-session video conference 154, video conferencing process 10 may transfer 106 the host (e.g., celebrity 152) between two or more of the discrete video conference sessions (e.g., discrete video conference sessions 156, 158, 160, 162, 164). For example and during execution 104 of multi-session video conference 154, video conferencing process 10 may transfer 106 celebrity 152: into discrete video conference session 156 (as shown by arrow 166); from discrete from discrete video conference session 156 to discrete video conference session 158 (as shown by arrow 168); from discrete video conference session 158 to discrete video conference session 160 (as shown by arrow 170); from discrete video conference session 160 to discrete video conference session 162 (as shown by arrow 172); and from discrete video conference session 162 to discrete video conference session 164 (as shown by arrow 174).

As celebrity 152 moves between e.g., discrete video conference sessions 156, 158, 160, 162, 164, video conferencing process 10 may continue to broadcast video feed 165 of celebrity 152 to each of the discrete video conference sessions (e.g., discrete video conference sessions 156, 158, 160, 162, 164). Accordingly, the participants in each of the discrete video conference sessions (e.g., discrete video conference sessions 156, 158, 160, 162, 164) may be able to watch video feed 165 of celebrity 152 regardless of which discrete video conference session celebrity 152 may be in. However, when celebrity 152 in present within the discrete video conference session that the participant is actually attending, video conferencing process 10 may be configured to allow celebrity 152 and the participants (e.g., users 36, 38, 40, 42) of that discrete video conference session (e.g., discrete video conference session 156) to engage each other (e.g., chat, ask questions, respond to questions, exchange data files).

Referring also to FIG. 7, when transferring 106 the host (e.g., celebrity 152) between two or more of the discrete video conference sessions (e.g., discrete video conference sessions 156, 158, 160, 162, 164) during multi-session video conference 154, video conferencing process 10 may render control panel 300 that defines the available sessions (e.g., discrete video conference sessions 156, 158, 160, 162, 164) and identifies the discrete video conference session that e.g., celebrity 152 is currently in. In this particular example, celebrity 152 is currently in discrete video conference sessions 156 and, therefore, the button corresponding to discrete video conference session 156 is shown greyed out.

Continuing with the above stated example in which celebrity 152 is currently in discrete video conference sessions 156, assume that celebrity 152 would like to move from discrete video conference sessions 156 to discrete video conference sessions 158. In this particular situation, the party initiating the transfer (e.g., celebrity 152 or an agent of celebrity 152) may select the button corresponding to discrete video conference session 158.

When transferring 106 the host (e.g., celebrity 152 or an agent of celebrity 152) between the plurality of discrete video conference sessions (e.g., discrete video conference sessions 156, 158, 160, 162, 164), video conferencing process 10 may receive 116 a request (e.g., request 54) from the host (e.g., celebrity 152) to move from a first discrete video conference session (e.g., discrete video conference session 156) to a second discrete video conference session (e.g., discrete video conference session 158).

In response to receiving 116 request 54, video conferencing process 10 may remove 118 the host (e.g., celebrity 152) from the first discrete video conference session (e.g., discrete video conference session 156) and add 120 the host (e.g., celebrity 152) to the second discrete video conference session (e.g., discrete video conference session 158).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
scheduling a multi-session video conference for a host, wherein the host is a celebrity;
defining a plurality of discrete video conference sessions;
linking the plurality of discrete video conference sessions to the multi-session video conference;
registering one or more participants for participation in one or more of the discrete video conference sessions;
executing the multi-session video conference; and
transferring the host between two or more of the discrete video conference sessions during the multi-session video conference.

2. A computer-implemented method comprising:
scheduling a multi-session video conference for a host;
linking a plurality of discrete video conference sessions to the multi-session video conference;
executing the multi-session video conference; and
transferring the host between two or more of the discrete video conference sessions during the multi-session video conference.

3. The computer-implemented method of claim 2 wherein the host is a celebrity.

4. The computer-implemented method of claim 2 further comprising:
registering one or more participants for participation in one or more of the discrete video conference sessions.

5. The computer-implemented method of claim 4 wherein the one or more discrete video conference sessions have a defined maximum number of participants.

6. The computer-implemented method of claim 2 further comprising:
defining the plurality of discrete video conference sessions.

7. The computer-implemented method of claim 2 wherein transferring the host between two or more of the plurality of discrete video conference sessions includes:
receiving a request from the host to move from a first discrete video conference session to a second discrete video conference session.

8. The computer-implemented method of claim 7 wherein transferring the host between two or more of the plurality of discrete video conference sessions further includes:
removing the host from the first discrete video conference session.

9. The computer-implemented method of claim 7 wherein transferring the host between two or more of the plurality of discrete video conference sessions further includes:
adding the host to the second discrete video conference session.

10. The computer-implemented method of claim 2 further comprising:
announcing the multi-session video conference via a social network.

11. The computer-implemented method of claim 2 wherein executing the multi-session video conference includes:
executing the multi-session video conference and the plurality of discrete video conference sessions within a social network.

12. A computing system including a processor and memory configured to perform operations comprising:
- scheduling a multi-session video conference for a host;
- linking a plurality of discrete video conference sessions to the multi-session video conference;
- executing the multi-session video conference; and
- transferring the host between two or more of the discrete video conference sessions during the multi-session video conference.

13. The computing system including of claim 12 wherein the host is a celebrity.

14. The computing system including of claim 12 further configured to perform operations comprising:
- registering one or more participants for participation in one or more of the discrete video conference sessions.

15. The computing system including of claim 14 wherein the one or more discrete video conference sessions have a defined maximum number of participants.

16. The computing system including of claim 12 further configured to perform operations comprising:
- defining the plurality of discrete video conference sessions.

17. The computing system including of claim 12 wherein transferring the host between two or more of the plurality of discrete video conference sessions includes:
- receiving a request from the host to move from a first discrete video conference session to a second discrete video conference session.

18. The computing system including of claim 17 wherein transferring the host between two or more of the plurality of discrete video conference sessions further includes:
- removing the host from the first discrete video conference session.

19. The computing system including of claim 17 wherein transferring the host between two or more of the plurality of discrete video conference sessions further includes:
- adding the host to the second discrete video conference session.

20. The computing system including of claim 12 further configured to perform operations comprising:
- announcing the multi-session video conference via a social network.

21. The computing system including of claim 12 wherein executing the multi-session video conference includes:
- executing the multi-session video conference and the plurality of discrete video conference sessions within a social network.

* * * * *